United States Patent
Oshima

(10) Patent No.: US 12,523,884 B2
(45) Date of Patent: Jan. 13, 2026

(54) DISPLAY DEVICE

(71) Applicant: ALPS ALPINE CO., LTD., Tokyo (JP)

(72) Inventor: Chihiro Oshima, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/986,102

(22) Filed: Dec. 18, 2024

(65) Prior Publication Data

US 2025/0237887 A1    Jul. 24, 2025

(30) Foreign Application Priority Data

Jan. 22, 2024   (JP) ................................. 2024-007204

(51) Int. Cl.
*G02B 30/56*   (2020.01)
*G02B 27/09*   (2006.01)

(52) U.S. Cl.
CPC ......... *G02B 30/56* (2020.01); *G02B 27/0983* (2013.01)

(58) Field of Classification Search
CPC ............................ G02B 30/56; G02B 27/0983
See application file for complete search history.

(56) References Cited

U.S. PATENT DOCUMENTS

| | | | | |
|---|---|---|---|---|
| 5,861,993 A * | 1/1999 | Shanks | ................... | G02B 30/56 359/629 |
| 11,340,475 B2 * | 5/2022 | Yamamoto | ............. | G02B 27/10 |
| 12,242,085 B2 * | 3/2025 | Kikuta | ................. | H04N 13/346 |
| 2021/0302752 A1 * | 9/2021 | Yan | ..................... | G02B 27/0172 |
| 2022/0373818 A1 * | 11/2022 | Ashimine | ............ | H04N 13/388 |
| 2023/0021677 A1 * | 1/2023 | Ashimine | ............... | G06F 3/042 |
| 2023/0148045 A1 | 5/2023 | Shimose et al. | | |

(Continued)

FOREIGN PATENT DOCUMENTS

| | | | | |
|---|---|---|---|---|
| CN | 108181712 A | * | 6/2018 | ............ G02B 5/128 |
| JP | 2015040943 A | * | 3/2015 | |

(Continued)

OTHER PUBLICATIONS

Extended European Search Report for 25151430.3 mailed on Jun. 30, 2025.

(Continued)

*Primary Examiner* — Dramos Kalapodas
(74) *Attorney, Agent, or Firm* — IPUSA, PLLC

(57) ABSTRACT

A display device is capable of displaying an aerial video image by utilizing retroreflection. The display device includes a light source configured to emit a video image from an emission surface; a first retroreflective member arranged on one end side of the light source to be inclined outward at a first inclination angle with respect to a normal to the emission surface; a second retroreflective member arranged on another end side of the light source to be inclined outward at a second inclination angle with respect to the normal to the emission surface; a first optical member configured to separate incident light into reflected light and transmitted light, which is arranged to face the first retroreflective member; and a second optical member configured to separate incident light into reflected light and transmitted light, which is arranged to face the second retroreflective member.

6 Claims, 7 Drawing Sheets

(56) References Cited

U.S. PATENT DOCUMENTS

2023/0280598 A1* 9/2023 Smithwick ............ G02B 30/52
359/478
2024/0411064 A1 12/2024 Smithwick et al.

FOREIGN PATENT DOCUMENTS

| JP | 2021-047438 | 3/2021 |
|----|-------------|--------|
| JP | 7240858 | 3/2023 |

OTHER PUBLICATIONS

Office Action dated Jul. 30, 2025 issued to related U.S. Appl. No. 19/016,432.
Extended European Search Report for 25151425.3 mailed on Jun. 4, 2025.

* cited by examiner

→ INCIDENT LIGHT
--→ RETROREFLECTED LIGHT

DISPLAY DEVICE

CROSS-REFERENCE TO RELATED APPLICATIONS

The present application is based on and claims priority to Japanese Patent Application No. 2024-007204 filed on Jan. 22, 2024, the entire contents of which are hereby incorporated by reference.

BACKGROUND

1. Field of the Invention

The present disclosure relates to a display device provided with a function of displaying a video image in the air by using retroreflection.

2. Description of the Related Art

Aerial imaging by retro-reflection (AIRR) is known. For example, the display device disclosed in Japanese Laid-Open Patent Application No. 2021-47438 is provided with a first retroreflective section arranged at a position in a direction in which light emitted from a light source is emitted, and an optical splitter which reflects at least a part of the light transmitted through the first retroreflective section as first reflected light and transmits at least a part of the first reflected light retroreflected by the first retroreflective section, enabling observation of an aerial image from a wide angle.

SUMMARY

The display device of the present disclosure is capable of displaying an aerial video image by utilizing retroreflection, and includes: a light source configured to emit a video image from an emission surface; a first retroreflective member arranged on one end side of the light source to be inclined outward at a first inclination angle with respect to the normal to the emission surface; a second retroreflective member arranged on the other end side of the light source to be inclined outward at a second inclination angle with respect to the normal to the emission surface; a first optical member configured to separate incident light into reflected light and transmitted light, which is arranged to face the first retroreflective member; and a second optical member configured to separate incident light into reflected light and transmitted light, which is arranged to face the second retroreflective member.

In one embodiment, the first optical member is arranged parallel to the first retroreflective member, and the second optical member is arranged parallel to the second retroreflective member. In one embodiment, the first and second retroreflective members are spherical or curved. In one embodiment, the display device displays a first aerial video image in a direction in which a retroreflective surface of the first retroreflective member faces, and displays a second aerial video image in a direction in which a retroreflective surface of the second retroreflective member faces, and the first and second aerial video images are the same image. In one embodiment, the first and second optical members are half mirrors, beam splitters, or polarized-beam splitters. In one embodiment, the display device is arranged in an interior space of a vehicle, between a driver's seat and a passenger's seat.

DETAILED DESCRIPTION OF THE DISCLOSURE

Figure 1A:
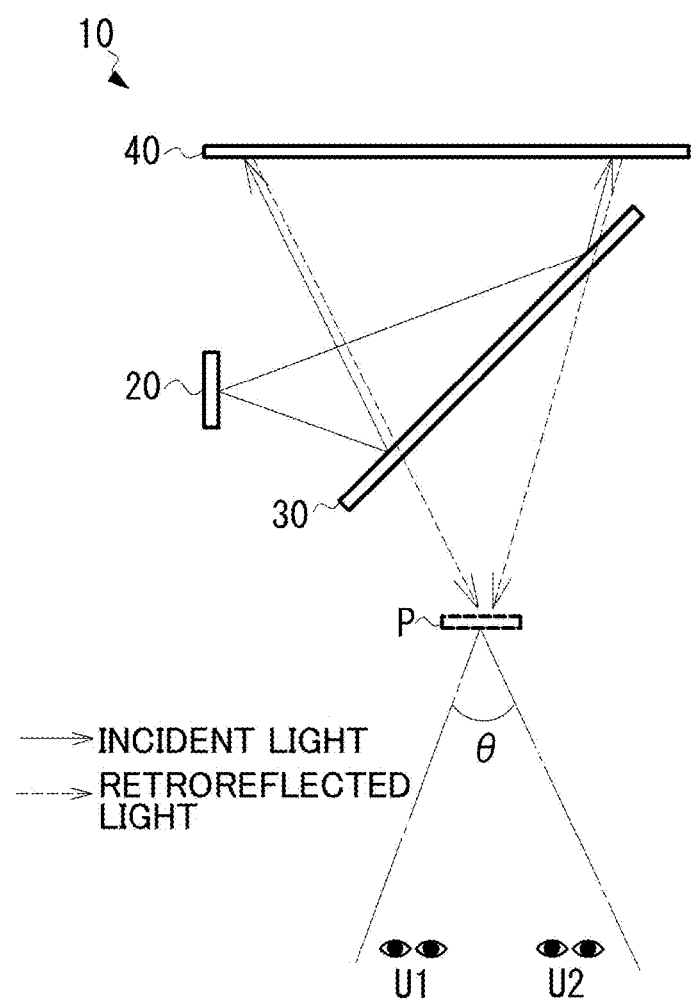
FIG. 1A is a schematic diagram illustrating a schematic configuration of an existing display device.
Figure 1B:
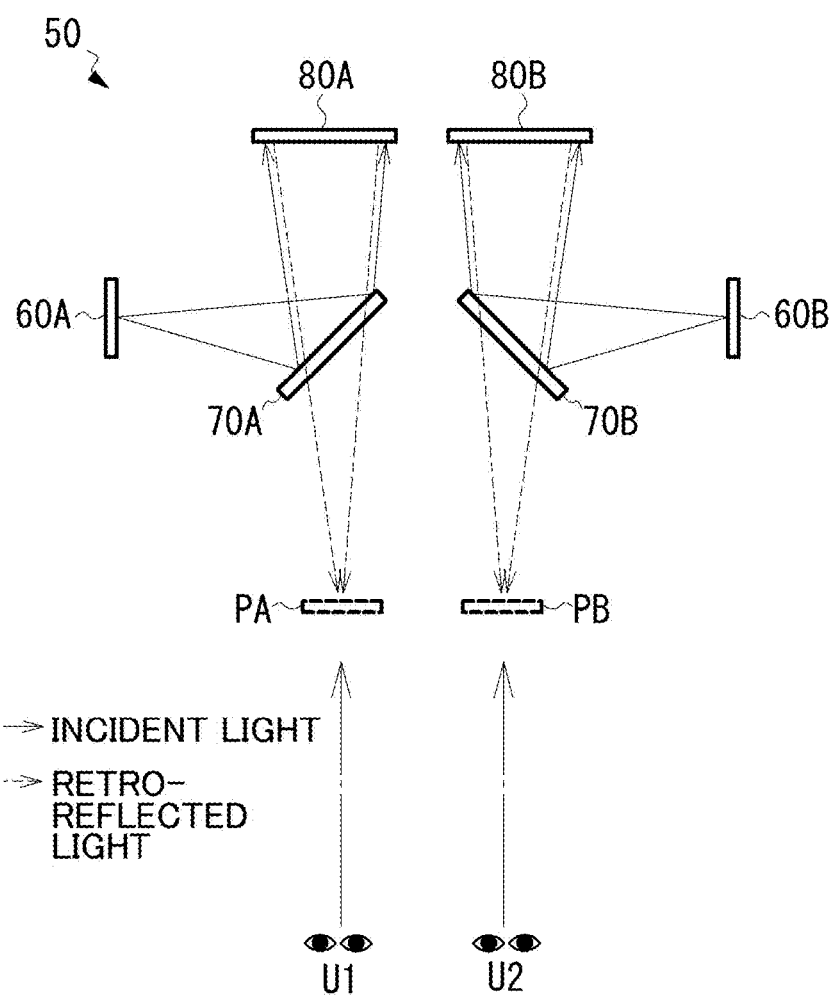
FIG. 1B is a schematic diagram illustrating another schematic configuration of an existing display device.

AIRR display devices are attracting attention for improving operability of non-contact devices and spatial design. In such cases, users do not necessarily view an aerial video image from the front, but may view it from a side depending on the situation, and a display device that provides a wide viewing angle is required. FIGS. 1A and 1B illustrate schematic configurations of existing display devices with a wide viewing angle. In the figure, a solid line indicates incident light, and a dashed line indicates retroreflected light.

A display device 10 as illustrated in FIG. 1A is provided with a display light source 20, a beam splitter 30, and a retroreflective member 40, and a wide viewing angle of an aerial video image is achieved by tilting the beam splitter 30 with respect to the retroreflective member 40. A part of the incident light emitted from the display light source 20 is reflected by the beam splitter 30, the reflected light is reflected by the retroreflective member 40 in the same direction as the incident light, the retroreflected light passes through the beam splitter 30, and an aerial video image P is displayed. The aerial video image P is formed at a position symmetrical to the display light source 20 with respect to a surface of the beam splitter 30. Users U1 and U2 can visually recognize the aerial video image P within a range of a viewing angle θ in which the retroreflective member 40 can be observed.

A display device 50 as illustrated in FIG. 1B is provided with two optical systems having a smaller size than the optical system as illustrated in FIG. 1A, namely, one set of display light sources 60A and 60B, one set of beam splitters 70A and 70B, and one set of retroreflective members 80A and 80B. Since the display light sources 60A and 60B emit video images of the same content, users U1 and U2 can simultaneously view the same aerial video images PA and PB, which effectively realizes a wide viewing angle of the aerial video image.

However, although the display device 10 as illustrated in FIG. 1A can increase the viewing angle of the aerial video image and allows the aerial video image to be seen from the side as well, there is an issue that the size of the optical system increases, and some video contents are difficult to be viewed from the side. In addition, the display device 50 as illustrated in FIG. 1B has an issue that, since a plurality of optical systems having a narrow viewing angle are arranged, the number of necessary members increases and the cost increases.

An object of the present disclosure is to provide a display device capable of expanding the viewing angle of an aerial video image while reducing the cost by solving such existing issues.

The display device according to the present disclosure displays an aerial video image or an aerial image by using retroreflection in a three-dimensional space that can be viewed without wearing special glasses or the like. It should be noted that drawings referred to in the following description of the embodiment include exaggerated representations to facilitate understanding of the disclosure and do not represent the actual shape or scale of the product.

EMBODIMENTS

Figure 2A:
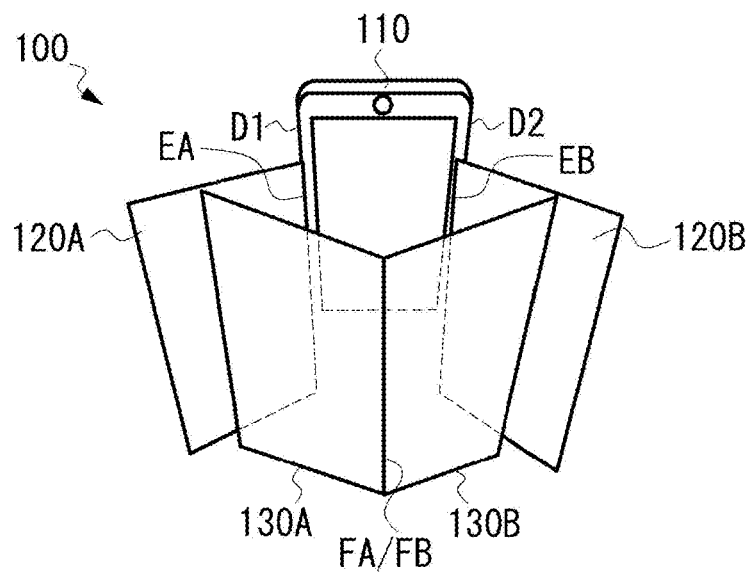
FIG. 2A is a front view illustrating a configuration of a display device according to an embodiment of the present disclosure.
Figure 2B:
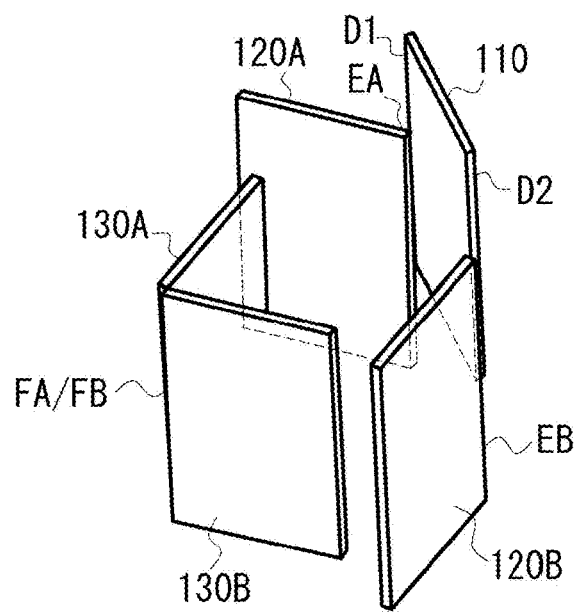
FIG. 2B is a perspective view illustrating the configuration of the display device according to the embodiment.
Figure 2C:
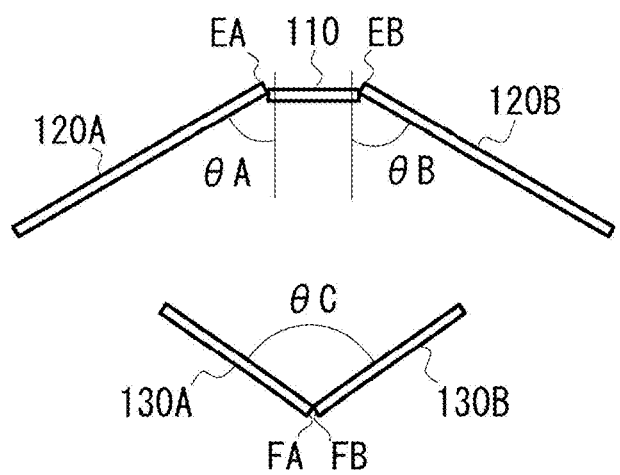
FIG. 2C is a top view illustrating the configuration of the display device according to the embodiment.

Next, an embodiment of the present disclosure will be described in detail. FIGS. 2A to 2C are views illustrating a configuration of a display device according to an embodiment of the present disclosure. FIG. 2A is a front view, FIG. 2B is a perspective view, and FIG. 2C is a top view of the configuration.

A display device 100 of the present embodiment includes a light source 110, a set of retroreflective members 120A and 120B, and a set of beam splitters 130A and 130B. Although not illustrated in the drawings, these members can be attached to a casing or housing, for example.

The light source 110 is, for example, a display light source such as a liquid crystal display device, an organic EL display device, or a projection-type display device, but is not particularly limited thereto as long as it has a function of emitting a video image or an image. The display light source has, for example, a rectangular emission surface, and emits a video image toward a direction (optical axis direction) that is normal to the emission surface. The display light source may be, although not particularly limited, a smartphone screen as illustrated in FIG. 2A, or may be a screen of a mobile terminal, a screen of a personal computer, a screen of a projector, or the like.

The retroreflective members 120A and 120B are optical members that reflect light in the same direction as the incident light, and are composed of, for example, prismatic retroreflective elements such as triangular pyramidal retroreflective elements, full-cube corner retroreflective elements, and bead retroreflective elements. The pair of retroreflective members 120A and 120B exemplified herein are composed of rectangular sheets or thin plates, of equal sizes. However, the retroreflective members 120A and 120B may have different sizes.

Specifically, one retroreflective member 120A is arranged such that its end EA is close to one end D1 of the light source 110 (or its emission surface) and a retroreflective surface of the retroreflective member 120A is inclined outward at an angle θA with respect to the normal (optical axis) to the emission surface (see FIG. 2C). The other retroreflective member 120B is arranged such that its end EB is close to the other end D2 of the light source 110 (or its emission surface) and a retroreflective surface of the retroreflective member 120B is inclined outward at an angle θB with respect to the normal (optical axis) to the emission surface.

The inclination angles θA and θB are set such that most of the light emitted from the light source 110 does not directly enter the retroreflective members 120A and 120B and to correspond to viewpoint positions of users. The size of the retroreflective surfaces of the retroreflective members 120A and 120B is determined such that the light reflected by the beam splitters 130A and 130B can be sufficiently incident thereon. When the viewpoint positions of the left and right users are symmetrical with respect to the display device 100, the pair of retroreflective members 120A and 120B can be arranged symmetrically with respect to the light source 110 by setting their inclination angles θA=θB. Furthermore, when the viewpoint positions of the left and right users are asymmetric or in different directions with respect to the display device 100, the inclination angle θA of the retroreflective member 120A and the inclination angle θB of the retroreflective member 120B can be set to different angles.

The beam splitters 130A and 130B are optical members that separate incident light into transmitted light and reflected light, such as half mirrors, or polarized-beam splitters when polarized light is used. The beam splitters 130A and 130B exemplified herein are formed of rectangular sheets or thin plates, of equal sizes. However, the beam splitter 130A and the beam splitter 130B may have different sizes.

Specifically, the beam splitter 130A is arranged to face the retroreflective member 120B, and the beam splitter 130B is arranged to face the retroreflective member 120A. The beam splitter 130A exemplified herein is arranged to be parallel to the retroreflective member 120B with a space therebetween, and the beam splitter 130B is arranged to be parallel to the retroreflective member 120A with a space therebetween. However, the beam splitter and the retroreflective member may not necessarily be parallel.

An end FA of the beam splitter 130A and an end FB of the beam splitter 130B may be arranged to be in contact with each other, or the end FA and the end FB may be arranged to be separated from each other. For example, the ends of the two beam splitters may be joined by an adhesive, or one beam splitter may be bent to form two beam splitters.

An angle θC formed by principal surfaces of the beam splitters 130A and 130B, the sizes of the principal surfaces of the beam splitters 130A and 130B, and distances from the light source 110 to the beam splitters 130A and 130B are set such that the light emitted from the light source 110 can be sufficiently incident thereon and the light retroreflected by the retroreflective members 120A and 120B can be sufficiently incident thereon. When the inclination angles are set θA=θB, the angle θC=2θA=2θB, and an optical system of the display device 100 is symmetrical to the normal (optical axis) passing through the center of the light source 110.

Figure 3:
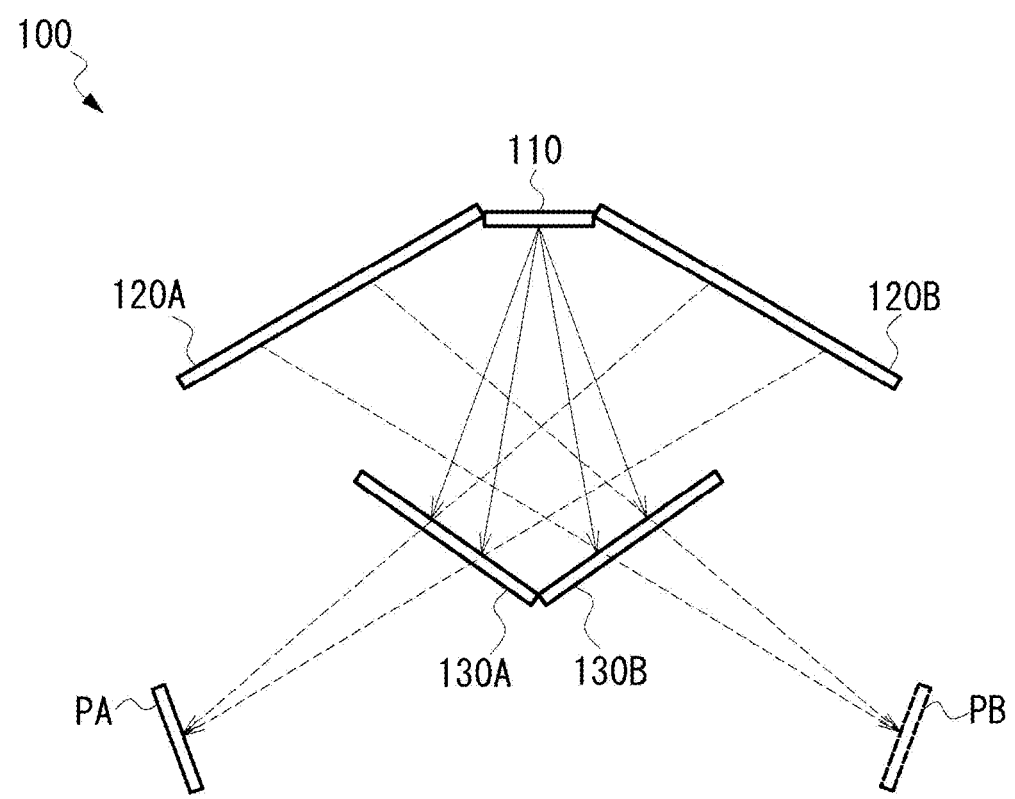
FIG. 3 is a light-beam diagram of the display device according to the present embodiment when aerial video images are displayed.

Next, the operation of the display device of the present embodiment will be described. FIG. 3 is a light-beam diagram when aerial video images are displayed, and only the light beam emitted from the center of the emission surface of the light source 110 is illustrated here. Solid lines indicate incident light, and dashed lines indicate retroreflected light. As illustrated in FIG. 3, the light (image) emitted from the emission surface of the light source 110 in a direction (optical-axis direction) that is normal to the emission surface of the light source 110 is incident on the pair of beam splitters 130A and 130B.

The light reflected by the beam splitter 130A is incident on the retroreflective member 120B facing thereto, and is retroreflected by the retroreflective member 120B. The retroreflected light is incident on the beam splitter 130A, and the light transmitted therethrough forms an image to generate an aerial video image PA. The light reflected by the beam splitter 130B is incident on the retroreflective member 120A facing thereto, and is retroreflected by the retroreflective member 120A. The retroreflected light is incident on the beam splitter 130B, and the light transmitted therethrough forms an image to generate an aerial video image PB.

The aerial video image PA is generated at a position symmetrical to the light source 110 with respect to the surface of the beam splitter 130A, and the aerial video image PB is generated at a position symmetrical to the light source 110 with respect to the surface of the beam splitter 130B. Since the aerial video image PA and the aerial video image PB share the image emitted from the light source 110, both are aerial video images of the same contents.

Figure 4:
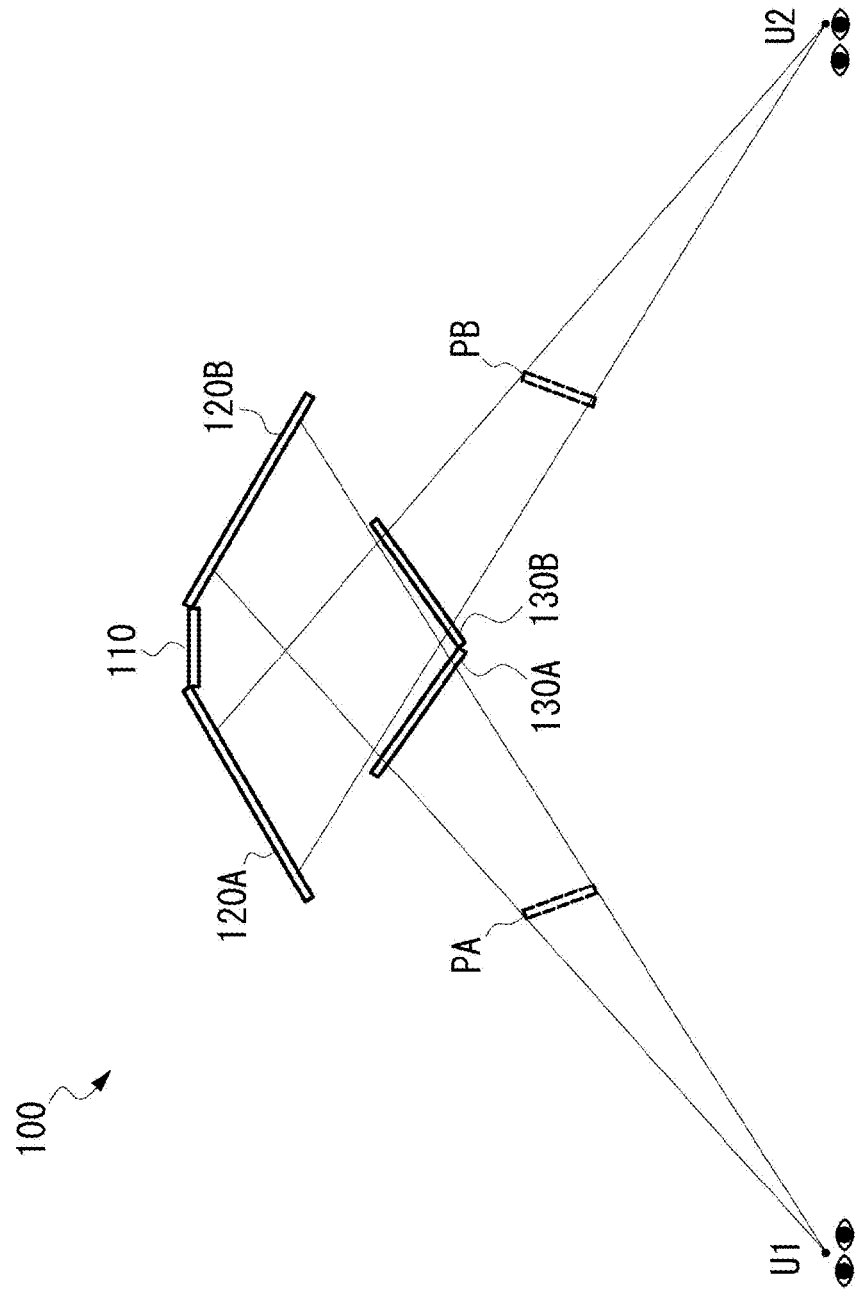
FIG. 4 is a light-beam diagram illustrating a relationship between users' viewpoint positions and the aerial video images.

FIG. 4 is a light-beam diagram when the aerial video images are viewed from two directions, in other words, from the left and right viewpoint positions. A user U1 on the left side, located in a direction of the inclination angle θB of the retroreflective member 120B, can observe the retroreflective member 120B through the beam splitter 130A from a viewpoint of the user U1, and thus can visually recognize the aerial video image PA in a viewing direction. A user U2 on the right side, located in a direction of the inclination angle θA of the retroreflective member 120A, can observe the retroreflective member 120A through the beam splitter 130B from a viewpoint of the user U2, and thus can visually recognize the aerial video image PB in a viewing direction.

As described above, according to the present embodiment, by arranging the pair of retroreflective members 120A and 120B inclined outward on both sides of the light source 110, and arranging the pair of beam splitters 130A and 130B to face the pair of retroreflective members 120A and 120B, respectively, it is possible to display aerial video images of the same contents in two directions, and in fact, the viewing angle of the aerial video image can be widened. Furthermore, depending on the arrangement of the optical system, each of the two users can view the corresponding aerial video image from the front thereof, which is advantageous in that the contents can be easily viewed. Moreover, by sharing the display light source, which is expensive among the optical system members used for displaying the aerial video image, it is not necessary to use two light sources as in the existing method (FIG. 1B), and the cost of the display device can be reduced.

As an aspect of this embodiment, when the light emitted from the light source 110 is polarized light (for example, a video image of a liquid crystal display device), a retardation film, for example, a λ/4 film may be provided on the surfaces of the retroreflective members 120A and 120B, and a polarized-beam splitter may be used for the beam splitters 130A and 130B. The polarized-beam splitter transmits a part of the light of a certain polarization state and reflects the rest. The polarizing direction of the polarized-beam splitter is determined in relation to the polarizing direction of the light emitted from the light source 110, and for example, the polarizing direction of the light source 110 is set to be substantially orthogonal to the polarizing direction of the polarized-beam splitter.

In the above-described embodiment, the pair of retroreflective members 120A and 120B are arranged on the left and right sides, respectively, of the light source 110 in order to display the two aerial video images in the left and right directions, but in order to display the two aerial video images in a vertical direction, the pair of retroreflective members 120A and 120B and the pair of beam splitters 130A and 130B may be arranged in such a positional relationship that the display device 100 as illustrated in FIG. 2 is rotated by 90 degrees.

Figure 5:
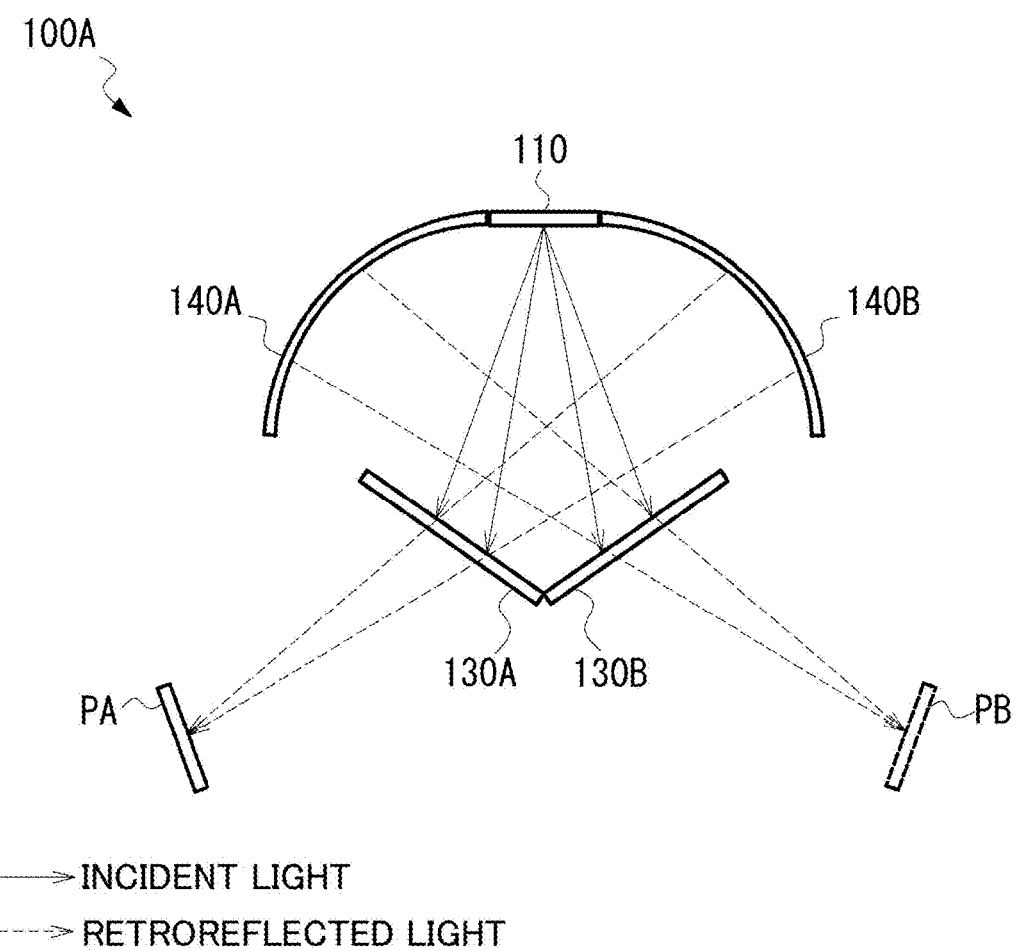
FIG. 5 is a diagram illustrating a modified example of the display device according to the present embodiment.

Next, a modified example of the display device of the present embodiment will be described. FIG. 5 is a top view of a display device 100A of the modified example. In the above embodiment, the retroreflective surfaces of the retroreflective members 120A and 120B are flat, but in the display device 100A of the modified example, retroreflective members 140A and 140B have curved retroreflective surfaces or spherical retroreflective surfaces. Curvatures or centers of the curvatures of the retroreflective members 140A and 140B are appropriately determined according to the viewpoint positions of the left and right users U1 and U2. By using such curved retroreflective members, each of the two aerial video images can be displayed, while facing closer to the front of the corresponding user U1 or U2.

Figure 6:
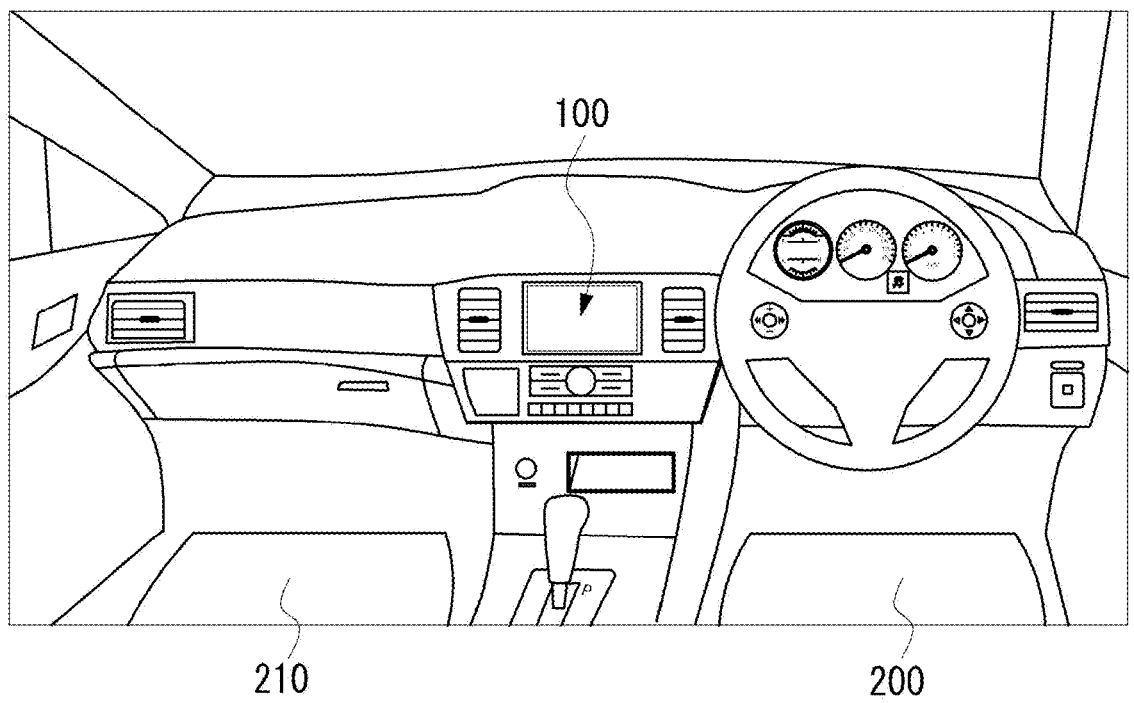
FIG. 6 is a diagram illustrating an application example of the display device according to the embodiment of the present disclosure.

As illustrated in FIG. 6, the display device 100/100A of the present embodiment can be installed in the interior space (for example, to a dashboard or instrumental panel portion) of a vehicle, between a driver's seat 200 and a passenger's seat 210, for example. A driver seated in the driver's seat 200 and a passenger seated in the passenger's seat 210 can visually recognize aerial video images displayed by the display device 100/100A from their respective viewing directions.

Furthermore, in addition to the interior space of a vehicle, the display device of the present embodiment can be applied to devices and systems that require viewing of aerial video images or aerial images from left and right sides. For example, the display device can be applied to the front of a seat of a 2-seater attraction, or to the front of a seat of a train, a bus, or an aircraft.

According to the present disclosure, first and second retroreflective members are arranged on both sides of a light source to incline outward, and the first and second optical members are arranged to face the first and second retroreflective members, respectively, so that two aerial video images with the same contents can be displayed in different directions, and thus the viewing angle of the aerial video images can be substantially increased. In addition, since two aerial video images are displayed by using one light source, the number of components of the optical system can be reduced, and the cost of the display device can be reduced.

Although the preferred embodiment of the present invention has been described in detail above, the present invention is not limited to a specific embodiment, and various modifications and changes can be made within the scope of the gist of the invention described in the claims.

What is claimed is:

1. A display device capable of displaying an aerial video image by utilizing retroreflection, the display device comprising:
   a light source configured to emit a video image from an emission surface;
   a first retroreflective member arranged on one end side of the light source to be inclined outward at a first inclination angle with respect to a normal to the emission surface;
   a second retroreflective member arranged on another end side of the light source to be inclined outward at a second inclination angle with respect to the normal to the emission surface;
   a first optical member configured to separate incident light into reflected light and transmitted light, the first optical member being arranged to face the first retroreflective member; and a second optical member configured to separate incident light into reflected light and transmitted light, the second optical member being arranged to face the second retroreflective member,
wherein
the first optical member is arranged parallel to the first retroreflective member, and the second optical member is arranged parallel to the second retroreflective member.

2. The display device according to claim 1, wherein the first retroreflective member and the second retroreflective member are spherical or curved.

3. The display device according to claim 1, wherein the display device displays a first aerial video image in a direction in which a retroreflective surface of the first retroreflective member faces, and displays a second aerial video image in a direction in which a retroreflective surface of the second retroreflective member faces, and the first aerial video image and the second aerial video image are a same image.

4. The display device according to claim 1, wherein the first optical member and the second optical member are half mirrors, beam splitters, or polarized-beam splitters.

5. A vehicle, comprises:
a driver's seat,
a passenger's seat, and
the display device according to claim 1 that is arranged in an interior space of the vehicle, between the driver's seat and the passenger's seat.

6. The display device according to claim 1,
wherein the first optical member and the second optical member are separate members,
the second optical member is inclined relative to the first optical member at a first predetermined angle,
a light source is disposed between the first retroreflective member and the second retroreflective member, and
the second retroreflective member is inclined relative to the first retroreflective member at a second predetermined angle.

* * * * *